Figure 1:
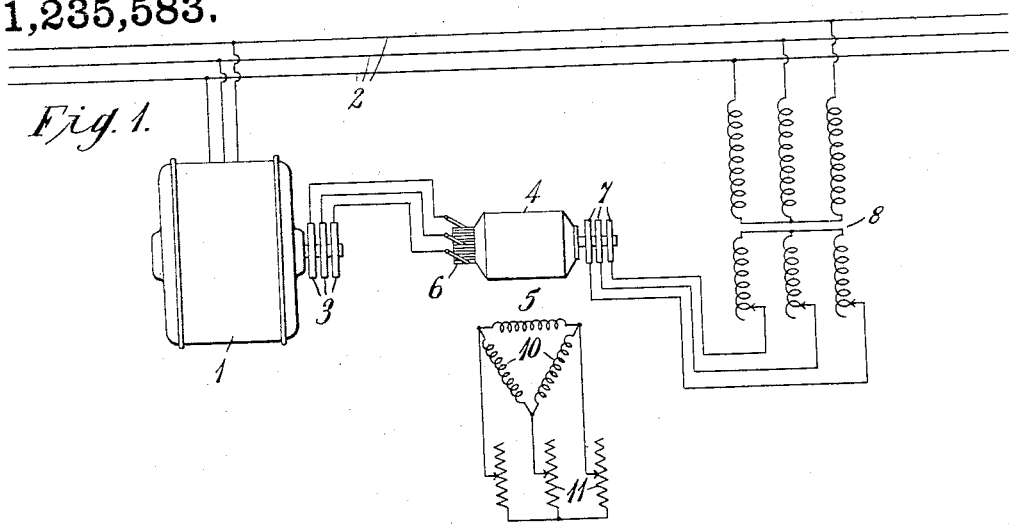

F. W. MEYER.
SYSTEM OF DISTRIBUTION.
APPLICATION FILED JAN. 11, 1913.

1,235,583.

Patented Aug. 7, 1917.

WITNESSES:
Fred H Miller
Otto S. Schairer.

INVENTOR
Friedrich W. Meyer
BY
Wesley G. Carr
ATTORNEY

UNITED STATES PATENT OFFICE.

FRIEDRICH W. MEYER, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION.

1,235,583.  Specification of Letters Patent.  Patented Aug. 7, 1917.

Original application filed October 7, 1911, Serial No. 653,380. Divided and this application filed January 11, 1913. Serial No. 741,458.

*To all whom it may concern:*

Be it known that I, FRIEDRICH W. MEYER, a subject of the Emperor of Germany, and a resident of Wilkinsburg, in the county of Allegheny and State of Pennsylvania, have invented a new and useful Improvement in Systems of Distribution, of which the following is a specification, this application being a division of application Serial No. 653,380, filed October 7, 1911.

My invention relates to systems of electrical distribution and particularly to means for regulating the speed and power factor of an induction motor.

The object of my invention is to provide simple and economical means for regulating the speed of an induction motor and causing it to operate at a good power factor under all conditions of load and speed.

Because of simplicity of construction and economy in first cost and in maintenance of induction motors, and also because of the simplicity of the supply system, it is highly desirable to employ such motors for the operation of hoists, rolling mills, and similar apparatus, and considerable attention has accordingly been devoted to the problem of obtaining a large range of economical speed regulation of the motors. To this end, it has heretofore been proposed to employ an auxiliary commutator machine as a means for regulating the speed of the motor, and of obtaining a certain degree of power factor compensation, the auxiliary machine serving either to assist the induction motor in carrying the load, or to return the energy of its secondary circuit or rotor to the supply circuit. However, in such previous arrangements, either the auxiliary machine must be large, especially if the motor speed is low and a large range of speed regulation is desired, or a second auxiliary machine is necessary. Furthermore, in previous systems, it is impossible to adjust the power factor of the induction motor to suit varying operating conditions, except by the provision of expensive and complicated auxiliary windings or combinations of windings, or by shifting the brushes of the auxiliary machine, which is objectionable since it interferes with good commutation.

According to the present invention, only a single small auxiliary machine is employed, and the power factor and speed of the induction motor may be readily and separately adjusted without shifting the brushes of the auxiliary machine or otherwise detrimentally affecting its commutation.

Figure 2:
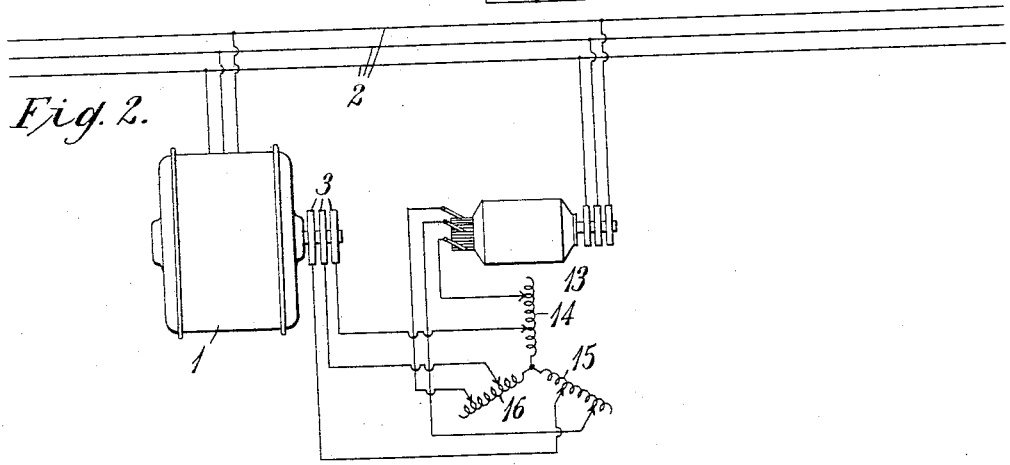
Figure 3:
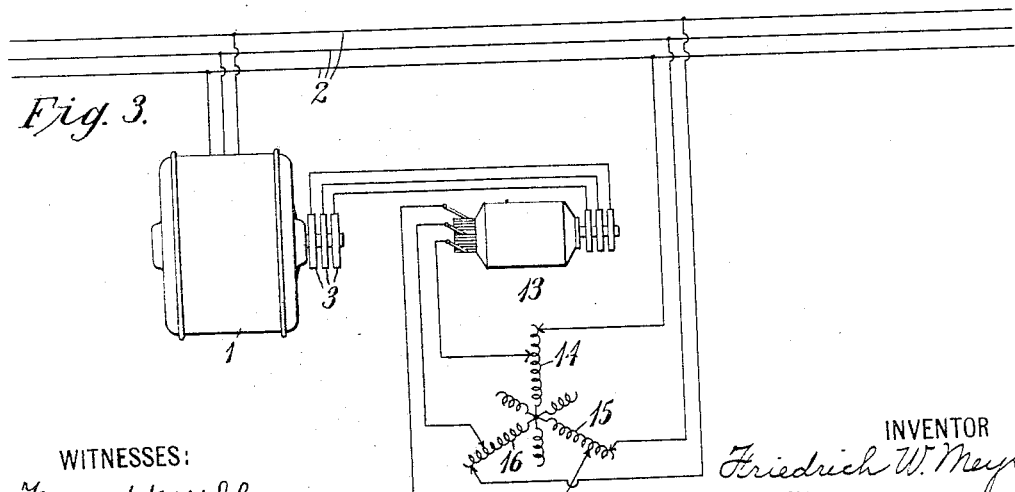

My invention is illustrated in the accompanying drawings, Figure 1 of which is a diagrammatic view of a system of distribution embodying the same. and Figs. 2 and 3 are similar views of modifications of the system of Fig. 1.

In each of the systems illustrated, an induction motor 1, that is adapted to drive any suitable load (not shown), such as a compressor, hoist or rolling mill, has its primary winding connected to, and receives energy from, a suitable supply circuit 2. The secondary winding of the induction motor is connected through slip rings 3 to the armature 4 of an auxiliary machine or frequency changer 5, the said armature being provided with both a commutator 6 and slip rings 7 and being also connected, either directly or indirectly, to the supply circuit 2. The energy of the secondary circuit or rotor of the induction motor thus passes through the auxiliary regulating machine or frequency changer, and is returned to the supply circuit.

In the system of Fig. 1, the commutator 6 of the auxiliary machine is connected to the slip rings 3 of the induction motor 1, and the slip rings 7 of the auxiliary machine are connected to suitable points in one of the windings of a transformer 8, the other winding of which is connected to the supply circuit. The transformer 8 serves both as means for transforming the voltage of the current received from the slip rings 7 of the auxiliary machine to a voltage suitable for application to the supply circuit, and as means for regulating the speeds of the induction motor and auxiliary machine.

The auxiliary machine 5 is provided with a simple three-phase field or stator winding 10 that is connected in closed circuit relation with variable resistances 11, but is otherwise entirely unconnected with other circuits of the system. The currents in the field or stator winding are only such as are induced therein and are only sufficient to give the torque required to overcome the friction of the machine and to cause it to run at the proper speed. This is because the field produced by the current flowing through the commutator is counteracted by the current flowing to the frequency changer through the slip rings, with the exception of that necessary for magnetizing the working field.

In the operation of the system, the induction motor 1 is started in any usual manner, and the auxiliary machine is also started by supplying it from the supply circuit through the regulating transformer 8 with current at a voltage corresponding to the desired voltage on the rotor of the induction motor, and the current in the stator winding 10 is then regulated by means of resistances 11 until the auxiliary machine runs in synchronism relatively to the induction motor. At this time, the connections between the slip rings of the induction motor and the commutator of the auxiliary machine are established, as shown, so that the energy in the secondary circuit or rotor of the induction motor may flow through the auxiliary machine and the regulating transformer to the supply circuit. Other methods may, of course, be employed, if desired, for starting the machines and bringing them into relative synchronism. The machines will thereafter continue to operate in relative synchronism under all working conditions, because of the synchronizing power of the frequency changer, and the speed of the induction motor may then be regulated by adjustment of the regulating transformer 8 so as to vary the voltage upon the secondary winding or rotor of the induction motor.

If, when the two machines are operating in relative synchronism, the resistances 11 are adjusted without changing the regulating transformer 8, the auxiliary machine or frequency changer has a tendency to correspondingly change its speed, which, however, is prevented on account of its connection to the induction motor and the synchronizing power of the auxiliary machine. The result is that equalizing currents will flow between the rotors of the two machines, which currents are largely wattless and produce a synchronizing force. The current in the regulating transformer 8 has a large wattless component which produces the field of the auxiliary machine, and also that of the induction motor. However, by regulating the resistances 11, and thereby the currents in the stator winding of the auxiliary machine, a greater wattless component may be produced than is necessary for the production of these fields, with the result that the main motor current may be made to lead to such an extent that the resulting current of the whole system will have substantially the same phase as the voltage or any other desired relation to it. The auxiliary machine serves only as a frequency changer, and the regulation of the current in its field or stator winding serves primarily to regulate only the power factor of the induction motor, though such power factor regulation is necessarily accompanied by a small degree of speed regulation, because the voltage drop in the machines varies somewhat when the wattless current is changed. When the power factor is improved, the speed increases, and vice versa. Consequently, if variations in power factor are permissible, very fine speed regulation may be obtained by adjustment of the resistances 11.

The use of the regulating transformer, as shown in Fig. 1, may be avoided in low-voltage systems by providing the auxiliary machine or frequency changer 13 with a stator or field winding having its several phase portions 14, 15 and 16 connected in star relation, as shown in Fig. 2. The stator winding is included in the connections between the slip rings 3 of the induction motor and the commutator of the auxiliary machine or frequency changer, the several connections to the said stator winding being adjustable so that the said winding may serve the function of a voltage regulator of the auto transformer type, in addition to its ordinary function. The voltage of the secondary winding or rotor of the induction motor, and consequently the speed of the motor, may be regulated, by changing the ratio of the lengths of the several divisions of the field winding between the neutral or common connection thereof and the points of connection thereto of the secondary slip rings of the induction motor, to the lengths of the said portions of the windings between the neutral or common connection thereof and the points of connection thereto of the commutator brushes of the auxiliary machine.

However, if this ratio is maintained uniform, which is equivalent to maintaining the ratio of transformation uniform in the transformer 8 of Fig. 1, while the points of connection to the several phase divisions of the stator winding are adjusted, so as to change the actual number of active turns in the said divisions of the stator winding and thereby vary the strength of the field, the wattless or equalizing currents will change and effect an adjustment of the power factor of the induction motor, as in the system of Fig. 1.

When it is necessary or desirable to operate the induction motor at or near synchronous speed, the system of Fig. 3 may be preferable to that of Fig. 2, as finer steps of speed regulation may be obtained at or near synchronous speed, because of greater uniformity of the field, although the auxiliary machine or the frequency changer is somewhat more expensive. In this system, the several divisions of the field or stator winding are connected together at intermediate points, and connections may be made thereto upon either side of their common point of connection to permit of convenient operation of the set either above or below synchronism. In this case, the slip rings of the induction motor are connected to the slip rings of the auxiliary machine or frequency changer and the stator winding of the frequency changer is included in the connections between the commutator brushes and the supply circuit. In this system, the induction motor may be run above synchronism and the auxiliary machine correspondingly below synchronism, by interchanging one pair of the connections between the machines.

I claim as my invention:

1. A system of distribution comprising a supply circuit, an induction motor supplied therefrom, an auxiliary machine having a stator winding, and an armature provided with a commutator and a set of slip rings that are connected respectively to the secondary winding of the induction motor and to the supply circuit, and resistances connected in closed circuit with the stator winding of the auxiliary machine.

2. A system of distribution comprising a supply circuit, an induction motor supplied therefrom, an auxiliary machine operated by its own motoric forces relatively in synchronism with the induction motor and having an armature provided with a commutator and a set of slip rings, one of which is connected to the supply circuit, and the other to the secondary winding of the induction motor, a stator winding for the auxiliary machine electrically disconnected from the remaining portions of the system, and means for adjusting the current in said stator winding.

3. A system of distribution comprising a supply circuit, an induction motor supplied therefrom, an auxiliary machine operated by its own motoric forces relatively in synchronism with the induction motor and having an armature provided with a commutator and a set of slip rings, one of which is connected to the supply circuit, and the other to the secondary winding of the induction motor, a stator winding for the auxiliary machine electrically disconnected from the remaining portions of the system, and adjustable resistance members connected in closed circuit relation with said stator winding for controlling the current flow therein.

In testimony whereof, I have hereunto subscribed my name this 31st day of December 1912.

FRIEDRICH W. MEYER.

Witnesses:
 OTTO S. SCHAIRER,
 B. B. HINES.